United States Patent [19]

LeCompte et al.

[11] Patent Number: 5,412,069

[45] Date of Patent: May 2, 1995

[54] TWO-PART POLYSULFIDE MOLDING COMPOSITION AND PROCESS

[75] Inventors: Robert A. LeCompte, Lebanon; Scott S. Moninghoff, Milford, both of N.J.

[73] Assignee: Rutgers, The State University of New Jersey, New Brunswick, N.J.

[21] Appl. No.: 100,083

[22] Filed: Jul. 30, 1993

[51] Int. Cl.⁶ ............................................. C08G 75/04
[52] U.S. Cl. ..................... 528/374; 524/700; 528/373
[58] Field of Search ................ 528/373, 374; 524/700

[56] References Cited

U.S. PATENT DOCUMENTS

| | | | |
|---|---|---|---|
| 2,195,380 | 3/1940 | Patrick | 528/373 |
| 2,402,977 | 7/1946 | Patrick | 528/388 |
| 2,465,513 | 3/1949 | Carasso | 524/202 |
| 2,466,963 | 4/1949 | Patrick | 528/387 |
| 2,557,778 | 6/1951 | Barry | 428/429 |
| 2,584,264 | 2/1952 | Foulks | 427/341 |
| 2,588,796 | 3/1952 | Benignus | 525/535 |
| 2,600,354 | 6/1953 | Wiss | 524/774 |
| 2,787,608 | 4/1957 | Gregory | 528/374 |
| 2,940,958 | 6/1960 | Smith | 528/374 |
| 2,940,959 | 6/1960 | Rosenthal | 528/374 |
| 2,964,503 | 12/1960 | Carpenter | 528/374 |
| 2,979,420 | 4/1961 | Harper | 427/409 |
| 3,024,131 | 3/1962 | Hutchinson | 428/417 |
| 3,032,439 | 5/1962 | Miller | 428/429 |
| 3,123,495 | 3/1964 | Carpenter | 428/419 |
| 3,225,017 | 12/1965 | Seegman | 528/373 |
| 3,282,902 | 11/1966 | Panck | 528/374 |
| 3,331,782 | 7/1967 | Deltieure | 502/1 |
| 3,349,047 | 10/1967 | Sheard | 528/374 |
| 3,349,057 | 10/1967 | Giordano | 524/781 |
| 3,637,612 | 1/1972 | Bertuzzi | 528/374 |
| 3,654,241 | 4/1972 | Doughty | 528/375 |
| 3,714,132 | 1/1973 | Nakanishi | 528/25 |
| 3,912,696 | 10/1975 | Doughty | 528/388 |
| 3,953,006 | 4/1976 | Patarcity | 366/81 |
| 4,060,570 | 11/1977 | Paul | 524/525 |
| 4,104,189 | 8/1978 | Hertwig | 502/324 |
| 4,165,426 | 8/1979 | Paul | 528/374 |
| 4,182,790 | 1/1980 | Schmiole | 428/260 |
| 4,190,625 | 2/1980 | Ellerstein | 264/176.1 |
| 4,192,941 | 3/1980 | Bertozzi | 528/374 |
| 4,518,767 | 5/1985 | Millen | 528/374 |
| 4,689,389 | 8/1987 | Lee | 528/109 |
| 4,689,395 | 8/1987 | Bergmann | 528/374 |
| 4,797,463 | 1/1989 | Grimm | 528/60 |
| 4,820,801 | 4/1989 | Inoue | 528/388 |
| 5,026,504 | 2/1991 | Campbell | 252/186.43 |
| 5,073,577 | 12/1991 | Anderson | 524/609 |
| 5,177,182 | 1/1993 | Lee | 528/374 |

FOREIGN PATENT DOCUMENTS

| | | |
|---|---|---|
| 872929 | 7/1961 | United Kingdom . |
| 2093050 | 8/1982 | United Kingdom . |
| 246874A | 11/1987 | United Kingdom . |
| 246875A | 11/1987 | United Kingdom . |
| 246929A | 11/1987 | United Kingdom . |

OTHER PUBLICATIONS

Hobbs, S. J., Polym. Mater. Sci. Eng., 67, 415–416, 1992 "Chain Modified Polysulfide Oligomers".

*Primary Examiner*—John Kight, III
*Assistant Examiner*—Terressa M. Mosley
*Attorney, Agent, or Firm*—Leroy G. Sinn

[57] ABSTRACT

Provided by this invention are two-part liquid polysulfide compositions which utilize stable and effective manganese dioxide or like curing agents which provide reasonable working times and gel times typically a maximum of 90 minutes and desirably rapid cure rates. Also, provided are stable and effective manganese curing compositions suitable for use as an element of such two-part liquid polysulfide compositions.

12 Claims, No Drawings

TWO-PART POLYSULFIDE MOLDING COMPOSITION AND PROCESS

FIELD OF INVENTION

This invention relates to two-part polysulfide compositions which use manganese dioxide or other like agents instead of relying upon a lead curing agent. The compositions are suitable for making molded parts at room temperature, including molds, which will provide upon curing a tough polymeric molded part having good tear strength.

BACKGROUND OF THE INVENTION

There has been a need for improved polysulfide molding compositions which avoid the use of a lead curing agent. Use of lead curing agent presents problems of pollution and toxicity. Polysulfide molding compositions are highly useful for making molds and other molded parts.

Two-part liquid polysulfide compositions have been used which cure at room temperature within a desired working time. Such two-part liquid compositions are made by a manufacturer at one location and are sold in containers to users who then mix the two parts at another location to form the final molding composition. The molding composition then must be worked or used to make the mold within a specific time period, such as within 10-30 minutes. There must be a balance between obtaining a desired rapid cure and yet permitting the molder adequate time to work the composition and to place it in place for molding.

The compositions must result in a molded part that has good tear strength and which provide a high-strength part. On the other hand, the molding composition, upon mixing the two parts, must provide a molding composition with relatively low viscosity so that it can be placed into the mold to make the desired part. In addition, it is highly important that the two-part composition has a good storage stability, in particular it is essential that the curing agent portion is stable.

For a pourable composition, it is important that the composition formed upon mixing the two parts retains a Newtonian flow only until the composition can be put in place in the mold whereupon rapid curing occurs to provide a tough polymeric molded part. For application to vertical surfaces, a thixotropic paste-like composition is desired.

Such two-part compositions would be useful for use as pourable mold compositions which cure to a flexible rubber mold, for casting objects from gypsum plasters, waxes, Portland cements and various thermoset resins such as epoxy resins, polyesters, polyurethane and others.

SUMMARY OF INVENTION

The compositions of this invention are compositions which are provided to the job site in two or more parts. One part of the composition is based upon a liquid polysulfide polymer. Single liquid polysulfides are utilized or mixtures of at least two liquid polysulfide polymers having different viscosities are used. The compositions use manganese dioxide as curing agent which converts the polysulfide polymer compositions to a tough polymeric final cured form. The compositions importantly do not depend upon conventional lead oxide curing agent with its known toxicity problems.

The polymer compositions are formed just prior to use by homogeneously mixing Parts A and B of the composition, which parts comprise:

Part A:

Part A comprises either a single or a combination of two or more liquid polysulfide polymers. If a combination is used, the liquid polysulfide polymers desirably have respective average molecular weights which are substantially different, for example, the molecular weight of one polysulfide polymer can desirably be about 2000 to about 3000, desirably about 2500, and a second liquid polysulfide desirably can be a molecular weight of about 3500 to about 4500, desirably about 4000. It has been found that about equal parts of such two different liquid polysulfide polymers is suitable. It is often optionally desirable to add to Part A a plasticizer. Dibutyl phthalate has been found to be suitable. It also has been found desirable to use a second plasticizer such as an equal amount of another plasticizer—an alkyl benzyl phthalate. It also has been found optionally suitable to add to Part A an effective amount, usually less than one part per hundred parts of Part A of elemental sulfur, for example, in the range of 0.1 to 0.5 parts per hundred parts of Part A. Additionally, it has been found optionally desirable to add an effective amount of carbon or other pigment.

Part B

Part B comprises activated manganese dioxide curing agent for curing the composition. About 35-45 parts of manganese dioxide per hundred parts of Part B is ordinarily suitable. A liquid medium is used which is compatible with the manganese dioxide curing agent and in which the catalyst is stable, is maintained in suspension and which does not interfere with the curing action. It is often optionally desirable to use a small effective amount of a wetting agent which reduces the thixotropic character of Part B and which does not interfere with the curing of the composition. A small effective amount of an accelerator can be optionally present for rapid cures of the composition, desirably the accelerator can be tetramethylthiuram disulfide (sold as Methyl Tuads) or another accelerator or combination of accelerators which provides the desired rapid acceleration provided by the tetramethylthiuram disulfide. Optionally a small effective amount of an inhibitor to reduce as desired the curing rate of the manganese dioxide catalyst, such as provided by a small amount of dimer acid. Optionally, a small effective amount of an amine or alkaline accelerator, such as diphenyl guanidine, tetramethyl guanidine, and the like for the manganese dioxide catalyst to provide enhanced cure rate as desired.

Instead of using manganese dioxide as the curing agent as described herein, other substantially equivalent curing agents can be used instead or in combination, such as sodium perborate, calcium peroxide, zinc peroxide and the like. Such improved two-part compositions are a part of this invention.

It has been found that a suitable medium for Part B can be selected from certain grades of chlorinated paraffins, such as sold under the designation Chlorowax, which promotes suspension and stability of the manganese dioxide curing agent. It has been found that certain chlorinated paraffins which have a low viscosity, which are non-hazardous and have a high chlorine content can be used, so long as they are compatible with the liquid polysulfides used. Chlorinated paraffin with a low chlorine content can cause bleeding from the final cured molded part which may be advantageous for certain applications. It has been found that a chloro content of about 50 percent by weight, for example, about 45 to about 55 percent, is suitable. Lower chloro content chlorinated paraffins have been found to cause an unwanted bleeding and a wet feel in the final molded part. Use of chlorinated paraffins having higher chloro contents can be undesirable, such as chlorinated paraffins having about 60 percent chloro content, can have viscosities which are too high. Other plasticizers can be used so long as they produce the good properties as provided by desirable chlorinated paraffins.

Sufficient amount of PART B is added to PART A to provide a desired working time, which is ordinarily about 20 parts of PART B.

The working time will be suitably about 5 to about 60 minutes, preferably about 10 to about 30 minutes. Working time is defined as that time required at room temperature for the composition to reach a viscosity of 20,000 centipoises (cps). Viscosity is determined at 78° F. using a Brookfield viscometer, Model HBT, No. 6 spindle, at 20 RPM.

Suitably, the cure time will be at least one hour to about 24 hours, depending upon the use made of the polysulfide composition. Ordinarily, the curing will occur overnight. It has been found that curing can occur in preferred compositions in about 6-8 hours, desirably in about 5 to about 12 hours. Cure time is defined as the time required for the composition to reach a desired Shore A hardness, for example, a value of 20. It is desirable to have a final Shore A hardness of 5 to 40 within 10 hours.

Gel time is defined as the time for the composition to reach a viscosity of 200,000 cps. It is ordinarily desirable to reach gel time at a maximum of 90 minutes.

DETAILED DESCRIPTION OF THE INVENTION AND THE PREFERRED EMBODIMENTS

A preferred composition of this invention can be made by utilizing a low viscosity liquid polysulfide, desirably having a small amount of crosslinking, such as 0.5 to about 2 percent. A second low viscosity liquid polysulfide can also be used in combination with the first polysulfide, if desired. This is also a liquid polysulfide having a higher viscosity and also having a small amount of crosslinking, such as 0.5 to about 2 percent. The liquid polysulfides are bis-(ethylene oxy) methane type polymers containing disulfide linkages and terminal SH groups. These polysulfides have the following general formula:

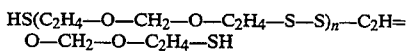

wherein n is a number sufficiently high to provide the desired viscosity and the desired properties in the final cured part of the composition, such as at least 10-15 units, desirably about 14, and at a higher molecular weight, 40-60 units being suitable, desirably about 45-50, for example, 47.

Such suitable polysulfides are available commercially, as from Morton Thiokol.

If a combination of liquid polysulfides is used, it is desirable that one polysulfide (I) have a molecular weight suitably of about 2500. The molecular weight can vary to a usable molecular weight of from, for example, about 1000 or about 1500 to about 3500. A second polysulfide (II) can desirably have a substantially greater average molecular weight than that of polysulfide (I), suitably at least 1000 greater. Suitably the molecular weight is about 4000. The molecular weight can vary but ordinarily the molecular weight will fall within the range of about 3500 to 5500.

It has been found suitable to employ approximately equal weight amounts of the polysulfide (I) and polysulfide (II). Those amounts can be varied so long as the desired properties in the final molding composition and cured part are obtained and the desired viscosity is obtained in the composition upon mixing Parts A and B. Ordinarily, the amount of polysulfides (I) and (II) will be within the range, based upon the total weight of polysulfides, from 30-70 percent of each to make up 100 parts of polysulfide content.

It is desired to add a pigment to Part A of the composition. It has been found desirable to use a suitable carbon black which is easily dispersed and broken up in the processing to provide Part A. A suitable carbon black can be obtained commercially, such as provided by the R. T. Vanderbilt Company. A suitable one is Vanderbilt N990.

The amount of carbon black or other filler that is employed can be varied. It has been found suitable to use about 30 percent by weight of Part A of carbon black. The amount of carbon black or other filler can be varied depending upon the particular formulation desired. For example, it is contemplated that the amount of carbon black or other filler can be varied between 0 and 50 percent.

It is desirable to utilize plasticizers in the compounding of Part A to lower viscosity and final hardness. It has been found suitable to utilize a plasticizer which has low viscosity, is economically feasible, and is compatible with the polysulfides. A suitable plasticizer will result in a composition which upon curing has the desired tear strength and Shore A hardness. A suitable Shore A has been found to be of about 1 to 40, desirably about 15 to about 25, presently desirably about 20.

A suitable plasticizer has been found to be butyl benzyl phthalate. The amount employed can be varied. It has been found suitable to use about 15% based upon the total weight of Part A. This can be varied to a suitable amount which is sufficient to provide the desired plasticizing action. A suitable amount of butyl benzyl phthalate increases tear strength.

Also, it is desirable to add dibutyl phthalate as a plasticizer in Part A. It is found suitable to provide the desired plasticizer at about 15% by weight of Part A, which amount can be varied as required. The quantity of dibutyl phthalate can also be varied ordinarily to provide an effective amount in the range of about 0-50 percent, often suitably about 5-20 percent.

To Part A is desirably also added an amount of elemental sulfur. This is found beneficial for use in the compositions calling for manganese dioxide as a curing agent. Its incorporation has been found to improve tear strength and also to reduce the creep of the molded parts. It has been found suitable to use about 0.2 percent. However, this can be varied to provide ordinarily a suitable and effective amount up to about 1 percent.

It is also found desirable to utilize an amount of a surfactant. The presence of an effective amount of a surfactant has been found to improve the flow properties. In selecting surfactants and the quantity, care must be taken to use amounts that will not adversely affect curing properties or result in other deleterious effects on the properties of the composition or the curing system. Also, selection of the surfactant must be made on the basis that it does not cause significant instability of Part A.

The amount of the surfactant used will be any amount that is effective. It has been found, for example, that approximately about 0.5 percent is effective. Ordinarily, an effective amount from about 0.1 to 1 percent is utilized. It has been found desirable to use an effective and compatible non-ionic surfactant.

It has been found that an amount of a retarding agent can be used to cause a desired reduction in the curing rate. It has been found that an amount of dimer acid, such as an effective amount up to about 1 percent, is suitable. It has been found in some circumstances that retarding agents such as isostearic acid and others can cause undesirable results such as instability and loss of activity in the compositions.

An amount of amine catalyst can optionally be used to accelerate curing rate, but should not be added to Part A.

In forming the composition of Part A, the liquid polysulfide or polysulfides, the carrier, the plasticizers, and surfactant are weighed and added to a suitable mixing vessel. While the mixing is proceeding, the pigment such as carbon black and elemental sulfur are added and the mixing is continued until a homogeneous mixture is obtained. The mixture then is subjected to a very high RPM mixing to improve the dispersion and to reduce any tendency to thixotropy. The mixture is desirably water cooled to prevent the mixture from exceeding 200° F. Exceeding 200° F. may cause some degradation in the composition.

After the desired degree of dispersion has been achieved, the speed of the cure can then be adjusted to match the Part B by the addition of an inhibiting agent. The specific amount of the inhibiting agent dimer acid or other inhibiting agent is determined for each batch on a laboratory scale basis.

Part B has manganese dioxide curing agent as the essential ingredient. The manganese dioxide used is what is known in the art as activated manganese dioxide. In providing Part B composition, it is essential to provide a formulation which is stable over a period of time and which will provide the desired type of curing rate. The curing must not be too rapid so that there is insufficient working time available upon admixing A and B. On the other hand, it is desired that the composition when put into place in the mold will cure at a reasonably rapid rate. For example, within 1-24 hours, ordinarily a curing overnight is satisfactory. In preferred compositions, desired hardness can be reached within 6-8 hours. Thus, the compositions provide a reasonable working time of at least about 10-30 minutes but provide the advantage of providing a very rapid cure to desired Shore A hardness within 6-8 hours.

In the Part B formulation, it has been found suitable to have a manganese dioxide content of about 30-50 percent by weight. The amount can be increased but the viscosity of Part B can become undesirably high. Therefore, the amount is adjusted to maintain Part B in a fluid state. Also present is a medium for maintaining the particles of the activated manganese dioxide catalyst in stable and suspended condition. Certain materials will maintain the activated manganese dioxide catalyst stable over the necessary shelf time in order that the composition can be manufactured, shipped to the customer and be held in storage as required. Ordinarily a stability from a practical point of view must be at least about three months. A suitable medium to be used can be about 50-60 parts by weight of a suitable chlorinated paraffin medium, terphenyl medium or other medium which provides the stability and suspending properties of a suitable chlorinated paraffin. It has been found that substitution of certain other plasticizers does not result in satisfactory stability and suspension of the manganese dioxide catalyst. It has been found, for example, that certain phthalate plasticizers and hydrocarbons do not provide satisfactory stability and suspension. Suitable chlorinated paraffins selected desirably must have low viscosity, be non-hazardous, and have a high chloro content. These properties promote the compatibility with polysulfides when admixture of Part A and Part B is made. It has been found that certain chlorinated paraffins do not function satisfactorily if they have low chloro contents and may result in unwanted bleeding out of such chlorinated paraffins upon curing of the molded part. A chlorinated paraffin which has been found suitable is Chlorowax 50 LV, which has a chloro content of 50 percent. A chlorinated paraffin having a chloro content of about 39 percent has been found to be unsatisfactory. Further, on the higher side, use of a chlorinated paraffin having a chloro content of about 60 percent has been found to be unsatisfactory, since its use provides a composition having excessive viscosity and other undesirable properties.

At times, it is desirable to add additional oxygen donor agents which will supplement the curing activity of the manganese dioxide, such as calcium peroxide, zinc peroxide, or other such agents which will be suggested to those skilled in the art.

It has also been found desirable to have present a wetting agent or surfactant which is compatible with the catalyst and other ingredients of Part B, as well as with Part A upon admixture. It has been found presently preferred to use certain non-ionic surfactants since they provide a more stable environment for the manganese dioxide catalyst than ionic surfactants and reduce the thixotropic tendency of Part B. The addition of the surfactant appears to be preferable at the end of the preparation of Part B.

A suitable surfactant has been found to be the non-ionic surfactant Synthron Acrylon MFP-F. It has been found suitable to employ about 1 percent based upon the weight of Part B formulation of the Synthron Acrylon MFP-F surfactant. This quantity of surfactant can be adjusted upwardly or downwardly as desired so long as the desired role of the surfactant is provided. In using other surfactants, the quantity might require some adjustment within the skill of the art to provide the desired properties provided by surfactant addition.

Also, it is desired to include an accelerator for the manganese dioxide curing agent. It is ordinarily found that an amount of an accelerator be present in order to obtain desired cure properties. For example, ordinarily when no accelerator is included, there are observed poor surface properties of the cured part. For example, the surfaces of the molded part can remain wet and tacky for an undesired length of time, up to several days.

It has been found that thiuram accelerators can be selected, such as sold as R. T. Vanderbilt's Unads, Butyl Tuads, and Methyl Tuads. It has been found highly desirable to add such accelerator after heat stabilization of the Part B formulation as described hereafter under the description of making the Part B formulation. If the accelerator is added prior to this time, a very slow cure rate is observed for the manganese dioxide catalyst.

It has been found that other curing rate accelerators can be used, such as quanadines (diphenyl quanadines or tetramethyl quanadine). It has been observed that use of these other accelerators may cause undesired creep property in the final molded part. Under certain circumstances, amine catalysts could be utilized, but can provide too short a pot life and can cause loss of activity during storage.

Optionally, a curing rate retarding agent is added to the Part B composition if it is desired or required to adjust the cure speed to be compatible with a standardized Part A. If a retarding agent such as dimer acid is added, it has been found to be desirable to add after the heat aging of Part B composition as described hereinafter, as is the case with the addition of tetramethylthiuram disulfide as an accelerator. It has been found that some retarders can cause the manganese dioxide system to be unstable and result in undesired loss of the curing activity. Dimer acid has been found to function suitably as a retarding agent and a compatible and effective amount can be used which has been found ordinarily to be up to about 1 percent based upon the weight of Part B composition.

Also, optionally as desired, an additional accelerator can be added to the Part B composition. In this regard, an amine accelerator can be employed. For example, it has been found suitable to use the following amine accelerator: 1,8-diazo-bicyclo(5,4,0) undecene, available from Air Products Company under the designation Polycat DBU.

Part B composition can be made by the following procedure: The chlorinated paraffin medium is weighed and added to a mixing vessel. While the chlorinated paraffin is being stirred, the proper amount of activated manganese dioxide curing agent is gradually added to the medium. The chlorinated paraffin/manganese dioxide catalyst medium combination is stirred until the mixture is homogeneous. The combination of chlorinated paraffin and manganese dioxide composition is a thixotropic liquid and is milled on a three roll mill until a satisfactory grind is achieved, such as 5-8 Hegman grind. It is preferred that only one pass through the three roll mill is necessary. Other milling devices can be utilized so long as the desired result is obtained. The milled mixture of manganese dioxide catalyst and chlorinated paraffin is aged to provide a stable manganese dioxide containing Part B, namely providing minimal changes in pot life and cure rates. Illustratively speaking, the aging process for producing stable manganese dioxide can be done either by permitting the milled manganese dioxide composition to stand at room temperature over a period of 3 to 12 weeks, or can be accelerated by aging with a suitable applied heat up to 150° F. such as about 135° F. over a period of 1-7 days. The resulting Part B composition comprising stable manganese dioxide catalyst has high stability in curing activity and provides predictable cure rates.

To the aged manganese dioxide/chlorinated paraffin mixture is added an accelerator in the proper amount, such as 1 percent by weight of the final Part B composition. A proper amount of tetramethylthiuram disulfide is added (0.5 percent by weight of the final Part B mixture has been found suitable). Then, the surfactant is added with mixing to the mixture. It has been found suitable to add about 1.0 percent by weight. The surfactant can be added at other points in the preparation, but it has been found desirable to add it after the heat aging of the manganese dioxide mixture.

A retarding agent such as dimer acid can be added at this point if it is desired that catalytic curing rate be slowed.

Also, optionally an amine accelerator can be added if it is required or desired that the catalytic reactivity rate of the Part B composition be accelerated.

The stability of Part B manganese dioxide composition can be evaluated by heat storing the composition at 90° F. Determination is made of gel time using the PART B manganese dioxide composition after various times of storage. The "gel time" is the time for the polysulfide composition using heat aged Part B to reach 200,000 cps. It is desired that gel time of the composition be 20-30 minutes or a maximum of 90 minutes. A greater gel time is unsatisfactory. Using the stable PART B manganese dioxide of this invention, the gel time remains substantially the same or undergoes very little increase, for example, after storing at the 90° F. temperature for 30 days, any increase in gel time is less than 50 percent, usually less than 25 percent.

EXAMPLE 1

The following Parts A and B were made in accordance with the following procedure:

| Part A | |
|---|---|
| 20% | LP977C |
| 20% | LP32 |
| 30% | Huber N990 Carbon Black |
| 14.75% | Santicized 160 |
| 14.21% | Dibutyl Phthalate |
| 0.2% | Elemental Sulfur |
| 0.5% | Synthron MFP-F |
| 0.34% | Dimer Acid |
| Part B | |
| 39.4% | Stable Manganese Dioxide (using Eagle Picher Type I to form sTABLE catalyst) |
| 59.1% | Oxychem Chlorowax 50LV |
| 1.0% | Synthron Acrylon MFP-F |
| 0.5% | R. T. Vanderbilt Methyl Tuads |
| 0-1.0% | Dimer Acid |
| 0-1.0% | Amine Catalyst |

Upon admixing 100 parts of Part A and various amounts of Part B, the mixture is promptly added to the desired surface for making the desired part, such as a mold. Amounts of Part B which are used are 10, 20 and 30 parts.

The resulting homogeneous mixtures of Parts A and B are applied to the surface desired. The surface is ordinarily treated so that the formed mold will release from the surface and will not damage it. It has been found that treating the surface with suitable mold release agent is ordinarily advisable, for example, with release agents sold by Polytek Development Corp. (POL-EASE). Ordinarily the mold thickness is built up as desired. The mold is permitted to cure overnight at room temperature. The resulting cured mold can be removed and used for the intended molding. Reinforcing agents can be incorporated into the composition in forming the mold, if desired.

EXAMPLE 2

Compositions following the general procedure described above are made using all LP977C, LP2, or LP32 liquid polysulfide as the single liquid polysulfide instead of the combination of liquid polysulfides as used in Example 1. Also, compositions are made using various combinations of the liquid polysulfides.

What is claimed is:

1. A stable, curable two-part polysulfide molding composition which has manganese dioxide as the curing agent, said two parts defined as follows:

Part A: (polysulfide part)

100 parts by weight of low viscosity liquid polysulfide having a small amount of crosslinking;

optionally an effective amount of a plasticizer or combination of plasticizers which are compatible with the liquid polysulfide component, providing desired low viscosity, being compatible with curing of the composition and being compatible with obtaining desired Shore A hardness, tear strength and low viscosity in the admixture of Parts A and B;

optionally an amount of a retarding agent to slow cure rate of the composition as desired;

optionally about 0.25 to 2 parts of elemental sulfur per 100 parts of liquid polysulfide; and optionally an effective amount of carbon or other pigment to pigment the composition;

Part B: (curing agent part)

100 parts by weight of activated manganese dioxide;

an amount of a medium to suspend the manganese dioxide in which the catalyst is compatible and stable;

an amount of a wetting agent which promotes stability of the manganese dioxide catalyst and reduces the thixotropic character of Part B and which is compatible with the curing of the composition;

an amount of an accelerator having the activity shown by presence of tetramethylthiuram disulfide;

optionally an amount of an inhibitor for the manganese dioxide to provide reduced cure rate as provided by dimer acid;

optionally an amount of an amine accelerator for the manganese dioxide to provide enhanced cure rate as desired;

said Part B catalyst showing a high stability of curing activity after 7–14 days in the accelerated stability test whereby a gel time of less than 90 minutes is provided;

said Part B medium providing the stability as provided by chlorinated paraffin having a chloro content of about 50 percent;

said composition made by adding a sufficient amount of part B with thorough mixing to Part A to provide a working time of about 10 to about 30 minutes, a gel time of about 30 to about 90 minutes and a cure time of about 1 to about 24 hours without use of agents to inhibit or accelerate the curing rate;

said composition providing upon curing a molded structure having good tear strength and a Shore A hardness of 5 to 40;

said viscosity determined at 78° F. as by using a Brookfield viscometer, Model HBT, No. 6 spindle, at 20 RPM.

2. A composition of claim 1 wherein the liquid polysulfide of Part A is a combination of a liquid polysulfide having an average weight of from about 2000 to about 3000 and a second liquid polysulfide having a molecular weight of from about 3500 to about 4500.

3. A composition of claim 2 wherein the first liquid polysulfide has an average molecular weight of about 2500 and the second liquid polysulfide has art average molecular weight of about 4000.

4. A composition of claim 1 wherein in Part A dibutyl phthalate is a plasticizer as defined in claim 1.

5. A composition of claim 1 wherein an effective amount of carbon is added to Part A to pigment the composition.

6. A composition of claim 1 wherein an effective amount of sulfur is added to Part A in the range of about 0.1 to about 0.5 parts per hundred parts of Part A to improve tear strength and to reduce creep of a cured molded structure of said composition.

7. A composition of claim 1 wherein the medium in Part B is an effective chlorinated paraffin.

8. A composition of claim 7 wherein the chlorinated paraffin has the properties of Chlorowax 50 LV.

9. A composition of claim 1 wherein there is incorporated into Part B a small effective amount of a non-ionic wetting agent to improve flow and a small effective amount of an accelerator to accelerate-curing rate.

10. A composition of claim 9 wherein the accelerator is tetramethylthiuram disulfide or an accelerator having essentially the properties of tetramethylthiuram disulfide.

11. A composition of claim 1 wherein the working time is about 10 to about 30 minutes and the gel time is a maximum of about 90 minutes.

12. A composition of claim 11 wherein the cure time is about 1 to about 24 hours, preferably within about 8 hours.

* * * * *

UNITED STATES PATENT AND TRADEMARK OFFICE
CERTIFICATE OF CORRECTION

PATENT NO. : 5,412,069
DATED : May 2, 1995
INVENTOR(S) : Robert A. LeCompte, et. al.

It is certified that error appears in the above-indentified patent and that said Letters Patent is hereby corrected as shown below:

Title page, item [73], Assignee: should read--Polytek Development Corp., Lebanon, N.J.--.

Signed and Sealed this

First Day of August, 1995

Attest:

BRUCE LEHMAN

Attesting Officer

Commissioner of Patents and Trademarks